United States Patent Office 3,315,478
Patented Apr. 25, 1967

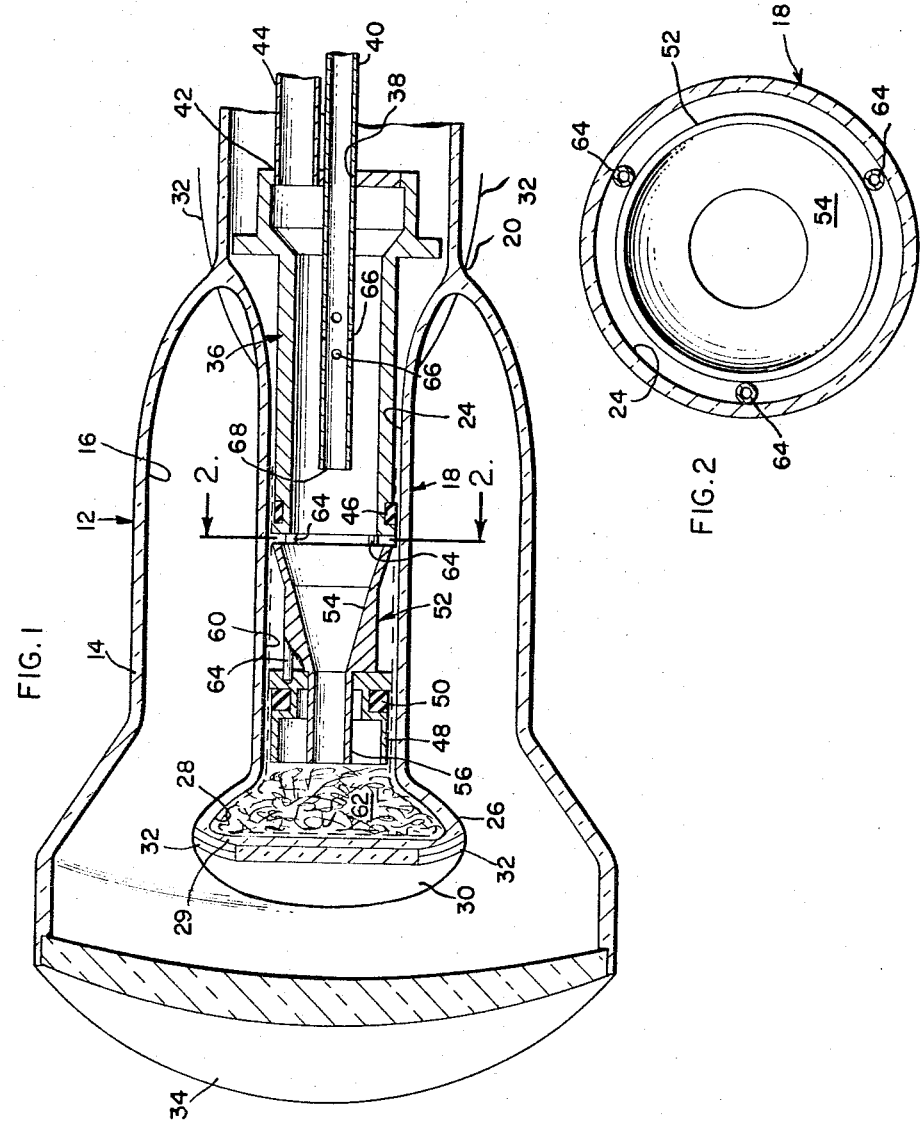

3,315,478
CRYOGENIC TRANSFER ARRANGEMENT
Peter J. Walsh and Kenneth W. Cowans, Los Angeles, Calif., assignors to Hughes Aircraft Company, Culver City, Calif., a corporation of Delaware
Filed June 29, 1965, Ser. No. 467,984
10 Claims. (Cl. 62—45)

The invention relates generally to an improved arrangement which may be utilized in the cryogenic cooling of a heat load, such as an electronic or similar device, and is particularly directed to a unique structure for collecting and maintaining cryogenic cooling fluid in appropriate physical and thermal transfer relation with the heat load.

It is well established in the art, that operating characteristics of many electronic devices are substantially enhanced when such operations are conducted within ambient temperature conditions falling within the cryogenic temperature range. Selection of cryogenic material to achieve a given refrigerating effect is usually based upon the temperature at which the selected material will liquefy and the relation that temperature bears to the optimum operating temperature of the related device. Typical cryogenic materials are nitrogen, air and neon. One mode of utilizing cryogenic cooling is to employ a structural arrangement known as a Dewar flask or simply a Dewar. A Dewar is a vessel having a central cooling finger located therein which is efficiently insulated from ambient condition by a surrounding vacuum space. Heat load is provided by an electronic device, such as an infrared detector, and is usually secured in abutting relationship to the bottom or internal end of the cooling finger. Thus thermal heat transfer relationship with the finger is established. An appropriate cryogen such as nitrogen, in liquid form, is continually supplied to an internal chamber of the cooling finger, the cryogen being deposited in that part of the chamber immediately juxtaposed to the secured device. By gradual vaporization, the liquid cryogen gives up its available refrigeration, cooling the device by conductive heat transfer. The vaporized cryogen is circuit returned to an appropriate refrigerating engine. Most frequently, the cycle described is continuous.

A problem devlops in many applications, such as airborne infrared scanning systems, which require that the detector assume a continuously varying attitude with relation to earth horizontal. Under such circumstances, prior art arrangements allowed the liquid cryogen to flow within the finger defined chamber and out of efficient thermal relation with the detecting device. As a result, the desired ambient temperature condition of the device was subject to variation and its utility and effectiveness as a detector importantly impaired.

Accordingly, it is a primary object of the invention to provide a structural arrangement for efficiently positioning and maintaining liquid cryogenic material in appropriate thermal heat transfer relation with a related heat load. Thus the load is maintained in a relatively steady-state temperature condition which insures optimum operation thereof.

It is another object of the invention to provide an arrangement of the type described which is effective to maintain said positioning and consequent steady-state condition regardless of the attitude of the arrangeemnt or its movement in space.

It is a further object of the invention to provide an arrangement of the type described to assure efficient refrigerating use of the cryogenic material and thereby avoid waste refrigeration.

The arrangement disclosed has particular utility when using those cryogenic materials which are adapted to the Liedenfrost transfer technique as described in U.S. Patent No. 2,996,893, issued to J. G. Goodenough et al. Typical examples of such cryogenic materials are air, nitrogen and neon.

It is yet another object of the invention to provide an arrangement of the type described which may be readily adapted to conventional Dewars with minimum design change or modification.

These and other advantages and objects of the invention will become apparent in the course of the following description and from an examination of the related drawings, wherein:

FIGURE 1 is a central, vertical, cross-sectional view, partly in elevation, of an arrangement disclosing the invention; and FIG. 2 is a cross-sectional view taken along line 2—2 of FIG. 1.

Describing the invention in detail and directing attention to the drawings, a Dewar arrangement is indicated generally at 12. The Dewar comprises an annular casing 14 having an internal cavity 16 within which is telescopically projected a cooling finger 18, the latter being integrally secured to the casing adjacent one end thereof as at 20. The space surrounding the finger 18 provides appropriate thermal insulation for the finger, as, for example, by creating a vacuum within the cavity 16. The casing 14 and the finger 18 may be formed of any suitable material; glass is frequently employed. Noting that FIG. 1 is a cross-sectional view, it will be understood that, except where noted, the structure hereinafter described is preferably of annular construction although other physical configurations may be employed.

The finger 18 is hollow and defines therewithin an internal chamber 24 which extends longitudinally thereof. The finger may be enlarged at its inner terminus as at 26 to internally define a liquid refrigerant chamber 28. The outer surface of the enlarged segment 26 may be slightly convex as at 29 and an appropriate heat load such as an infrared detector 30 may be bonded thereto. Wire leads 32, 32 may be arranged in electrical communication with the detector 30 and are carried by the structure so that they may be appropriately connected to a related device.

In those cases where the load 30 is an optically sensitive, a segment of the casing 14 is formed as a window 34 which is capable of passing the waves of the energy spectrum within device detection range.

Disposed within the chamber 24 of the finger 18 is a filler and exhaust housing indicated generally at 36. Housing 36 is centrally cored and an appropriate aperture 38, at one end thereof, accommodates the entrance of a filler tube 40. Via another opening 42 an exhaust tube 44 is connected to housing 36 and communicates with the central core of the housing. At the internal terminus of the housing 36 an appropriate seal 46 is carried, such as a conventional O-ring, and establishes pneumtic closure with the inner surface of the chamber 24.

Adjacent the refrigerating chamber 28, a guide support housing 48 is positioned within chamber 24. Again, the support housing has an annular seal 50 which provides pneumatic closure with the adjacent inner surface of the chamber 24. The guide support housing 48 has connected thereto a collector and guide device indicated generally at 52, said device comprising a funnel-shaped collector section 54 and a tubular standpipe section 56, the latter projecting into the refrigerant chamber 28. Thus, it will be seen that the collector section 54 may be said to be axially in line and in generally congruent association with the end opening of the central core of the filler and exhaust housing 36.

Completing the structure disposed within the chamber 24, an annular layer of heat conducting material 60 annularly engages the surface of chamber 24 and chamber 28. A matrix comprising a plurality of metallic shavings 62 are preferably positioned within the chamber 28. The layer of heat conducting material may be a thin layer of metallic silver or the shavings 62 may be formed as a matrix of fine silver or bronze wire or the like. In a preferred form of the invention, housings 36 and 48 may be formed of brass and the guide and collector device 52 formed of a glass loaded Teflon or other similar material having a low surface frictional coefficient. Experience has shown that such material offers easy machinability and low heat conductivity through its body and over the area thereof. Specifically, it has been found that cryogenic liquid does not "wet" the surface of the device but rather balls and moves over the surface easily. Without wetting, heat transfer over the device surface is minimal.

The collector device 52 is secured to the housing 48 in any conventional manner. Where the device 52 is formed from the noted Teflon material, it may be surface etched in the area of abutment with the housing 48 and thereafter secured to the housing with conventional epoxy resin bonding material. A plurality of hollow capillary tubes 64, 64 (FIG. 2) mechanically interconnect the housing 48 and the filler and exhaust housing 36. Employing the hollow tubes 64 minimizes weight and heat transfer and provides the strength and rigidity to maintain the parts in appropriate relation.

Describing the operation of the arrangement, it will be recalled that cryogenic fluid is delivered by employing the Liedenfrost technique. It will be understood that using such technique, the cryogenic fluid in droplet form is entrained in flowing gas moving into the finger 18 through the filler tube 40. The gas which acts as a vehicle for the entrained droplets is comparatively warm and the temperature thereof approximates ambient. Accordingly, it is desirable to provide, in the filler tube 40 and at a point therein in substantially spaced relation to the refrigerating chamber 28, a plurality of holes or apertures 66, 66. The apertures 66 allow the relatively warm entraining gas to bleed off within the housing 36 in an area in reasonably close adjacency to the exhaust tube 44. The kinetic energy of the relatively heavy moving cryogenic droplets urges the droplets to continue motion and escape from the opening 68 of the filler tube 40. As the droplets move they are captured by the funnel-shaped collector section 54 of the device 52 and are conveyed via standpipe section 56 to refrigerant chamber 28. Within the chamber 28 the metallic shavings 62 tend to capture the liquid fluid and the chamber fills. The shavings 62 dispose the liquid fluid in appropriate thermal heat transfer relationship with the heat load 30 on the opposed side of the adjacent wall of the finger 18.

In service, the arrangement assumes various attitudes with relation to earth horizontal. In spite of this motion, substantially all of the liquid within the chamber 28 will remain therein. Outward flow thereof is inhibited by the housing 48 and seal 50. The standpipe section 56 reduces to a minimum liquid loss as the arrangement moves in space and sufficient liquid remains in chamber 28 to effectuate the refrigerating function. Standpipe section 56 acts as both a fluid entrance and a vapor exhaust port for the boiling cryogenic fluid.

In this connection, it will be noted that the bleed-off apertures 66 and the opening 68 of tube 40 should be substantially spaced from the chamber 28 so that the relatively warm entraining gas escaping therefrom will have no thermodynamic effect on the liquid refrigerant in chamber 28. The mass of vaporized cryogen escaping from chamber 28 creates a momentum balance of the relatively cold vapor moving toward the exhaust tube 44 which carries with it warm gas escaping from filler tube 40. This excessive vaporization or boil off of the cryogenic liquid is avoided and refrigerating efficiency improved.

It is preferred that the exhaust tube 44 should be formed of a high thermally conductive material such as copper. It will be understood that the relatively cold vapor given off by the boiling refrigerant within the chamber 28 should be cooled to approximately ambient temperature before returning to other parts of the system. The relatively high thermal conductivity of the exhaust tube 44 provides sufficient warming of the vaporized cryogenic fluid. In practice it is sometimes desirable to provide an additional conventional heat sink surface (not shown) associated with tube 44 to ensure adequate warming of the vaporized fluid.

It will thus be apparent that the disclosed arrangement provides a highly efficient mode of capturing, positioning and maintaining the cryogenic refrigerating fluid in desired thermal relationship with an operating heat load device. The arrangement is effective to maintain the device in a relatively steady-state thermal condition regardless of the attitude of the arrangement in space. In this manner the arrangement offers a high degree of utility by virtue of continued maintenance of the heat load at optimum operating temperature.

The invention as disclosed is by way of illustration and not limitation and may be modified in various particulars within the scope of the appended claims.

What is claimed is:

1. In a cryogenic refrigerating fluid transfer arrangement,
   a hollow cooling finger having a separate liquid refrigerant chamber at one aspect thereof,
   a fluid droplet collector and guide device defining one end of the refrigerant chamber and in transfer communication therewith,
   a filler line operative to convey refrigerating fluid to the hollow cooling finger,
   said device being positioned within the hollow finger to collect the conveyed refrigerating fluid and guide same to the refrigerant chamber,
   the device and collector being in spaced relation to each other,
   the space between said device and collector providing a common path to admit fluid droplets to the device for conveyance to said chamber and to accommodate the escape of evaporated fluid from the chamber, and
   means associated with the device to inhibit escape of refrigerating fluid from the chamber,
   said last-mentioned means being effective to inhibit said escape as the arrangement is moved into various physical attitudes in space.

2. In a cryogenic fluid transfer arrangement according to claim 1, wherein said liquid refrigerant is conveyed through said filler line as liquid droplets entrained in a flowing gas,
   said line having gas vent opening means therein communicating with the hollow finger in spaced relation to said refrigerant chamber, and
   a gas exhaust tube communicating with the hollow finger.

3. A cryogenic refrigerating fluid transfer arrangement according to claim 2, wherein said device comprises a collector section having an outwardly diverging opening in operative alignment with the filler line,
   said device further comprising a guide section establishing communication between said diverging opening and the refrigerant chamber,
   said guide section being operative to inhibit the flow of liquid refrigerant from the refrigerant chamber as the physical attitude of the arrangement is varied in space.

4. A cryogenic refrigerating fluid transfer arrangement according to claim 3, wherein said guide section is formed as a standpipe and projects into the refrigerant chamber,
   said guide section being in sealed engagement with the adjacent annular inner wall of the hollow finger.

5. A cryogenic refrigerating fluid transfer arrangement according to claim 4, and
including a matrix of thermally conductive material disposed in the refrigerant chamber.

6. In a cryogenic refrigerating fluid transfer arrangement,
a hollow cooling finger having a liquid refrigerant chamber at one end thereof,
a heat load secured to the finger at said one end and on the outside surface thereof,
said heat load being in heat transfer relation with the refrigerant chamber,
means within the finger separating the refrigerant chamber from the balance of the hollow finger,
a filler line entering the hollow finger at the other end thereof,
said line being operative to deliver droplets of liquid refrigerating fluid to the hollow casing,
said separating means being in spaced relation to the terminal point of said line,
said separating means including means to collect the delivered droplets of fluid and guide said droplets to the refrigerant chamber, and
the space between said separating means and said terminal point providing a common path to admit fluid droplets to the collection means of the separating means and to accommodate the escape of evaporated fluid from the chamber.

7. A cryogenic refrigerating fluid transfer arrangement according to claim 6, wherein said collection and guide means comprise a funnel segment in alignment with an expulsion port of said terminal point of said filler line and a standpipe segment projecting into the refrigerant chamber,
said standpipe segment accommodating entrance of the droplets to the refrigerant chamber and escape of vaporized refrigerating fluid from the refrigerant chamber.

8. In a cryogenic refrigerating fluid transfer arrangement,
an annular casing defining an internal cavity,
a cooling finger secured to the casing at one end thereof and telescopically projecting into the cavity,
said cooling finger being hollow and defining a refrigerant chamber at the inner end thereof,
means separating the refrigerant chamber from the balance of the hollow finger,
said means including a refrigerant fluid collection segment and a refrigerant fluid guide segment projecting into the refrigerant chamber,
a filler line projecting into the hollow finger at the other end thereof and operative to deliver refrigerant fluid droplets to the hollow finger,
the terminal point of said line being in spaced relation to said fluid collection segment,
said droplets being delivered to the hollow finger entrained in a flowing gas,
an exhaust tube communicating with the hollow finger,
vent means formed in the filler line and operative to vent the flowing gas to the hollow finger,
said vent means being disposed in substantial spaced relation to said refrigerant chamber,
the space between said terminal point and said fluid collection segment providing a common path to admit fluid droplets to the segment for conveyance to said chamber and to accommodate the escape of evaporated fluid from said chamber, and
a heat load device secured to the cooling finger on an outer surface thereof and in physical juxtaposition to the cooling chamber to accommodate thermal heat transfer therebetween.

9. A cryogenic refrigerating fluid transfer arrangement according to claim 8, and including a filler and exhaust housing disposed within the hollow finger,
said housing having apertures therein to permit the filler line and the exhaust tube to communicate with the hollow casing,
said collection segment defining a funnel-shaped opening in operative alignment with the filler line,
means establishing a pneumatic seal between the separating means and the annular inner wall of the hollow finger,
other means establishing a pneumatic seal between the filler and exhaust housing and the annular inner wall of said finger,
and a matrix of thermally conductive material disposed in the refrigerant chamber.

10. A cryogenic refrigerating fluid transfer arrangement according to claim 9, wherein said separating means includes a supporting housing carrying said segments,
said last mentioned pneumatic seal means being carried by the supporting housing, and
a plurality of capillary tubes interconnecting the housings.

References Cited by the Examiner
UNITED STATES PATENTS

| | | | |
|---|---|---|---|
| 966,076 | 8/1910 | Bobrick | 62—239 |
| 2,892,250 | 6/1959 | Bartels | 62—514 |
| 2,939,938 | 6/1960 | Ravich | 62—514 |
| 3,016,716 | 1/1962 | Walker | 62—52 |
| 3,064,451 | 11/1962 | Skinner | 62—514 |

LLOYD L. KING, *Primary Examiner.*